UNITED STATES PATENT OFFICE.

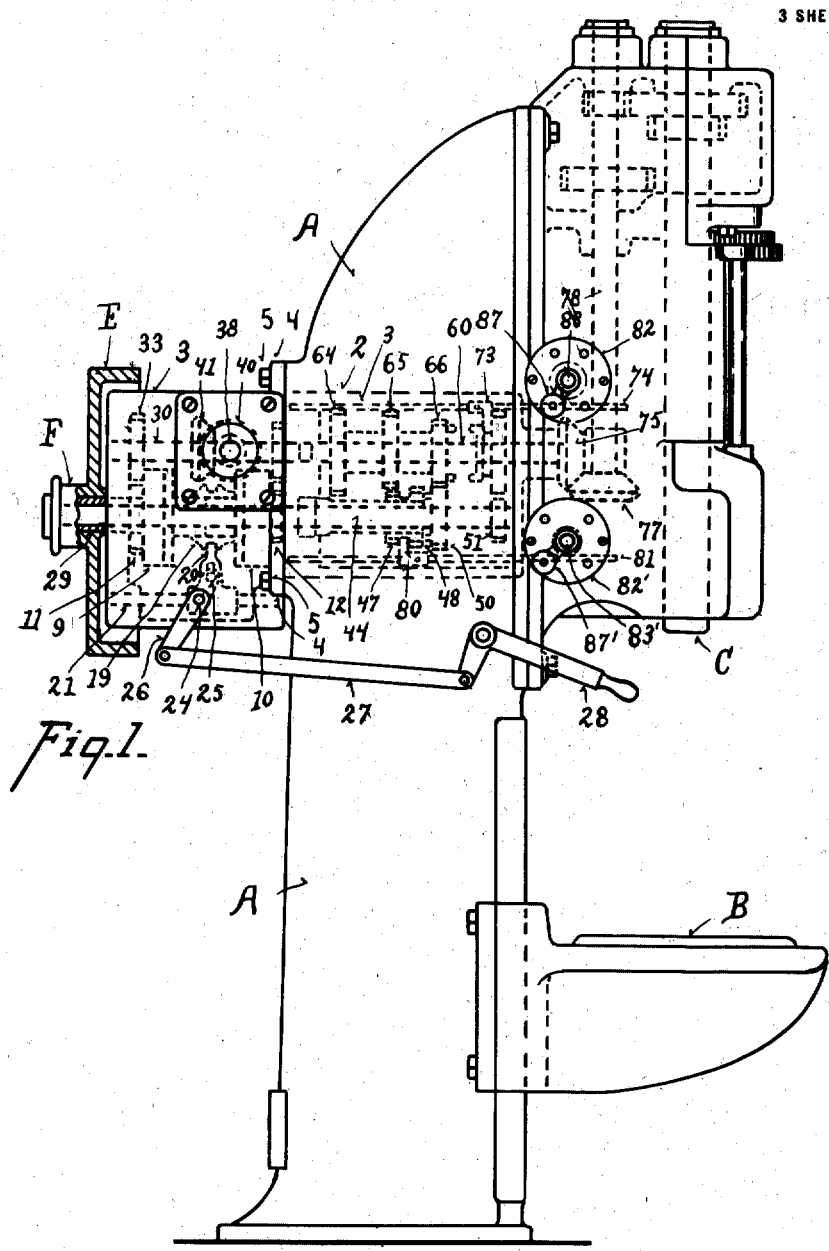

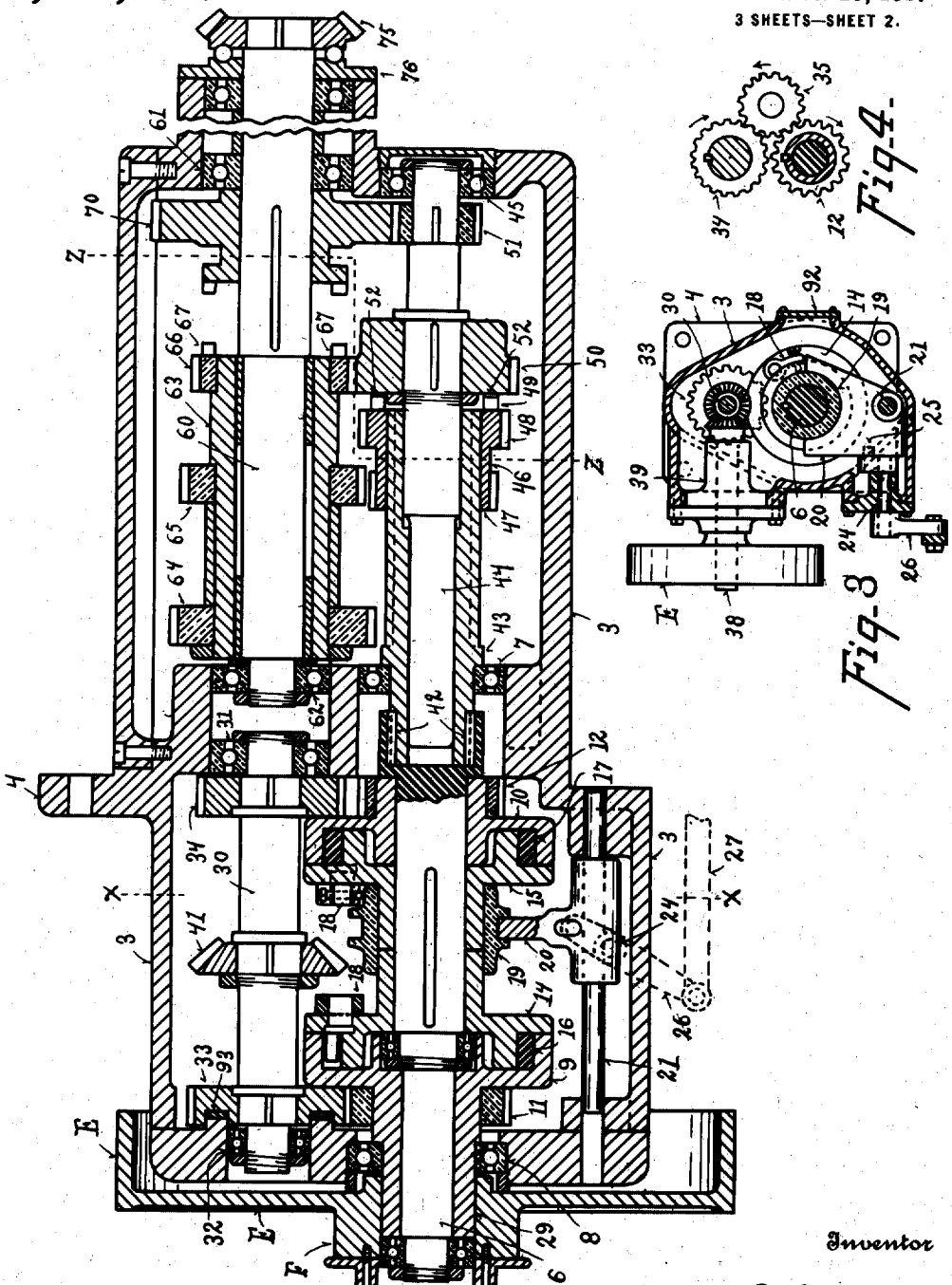

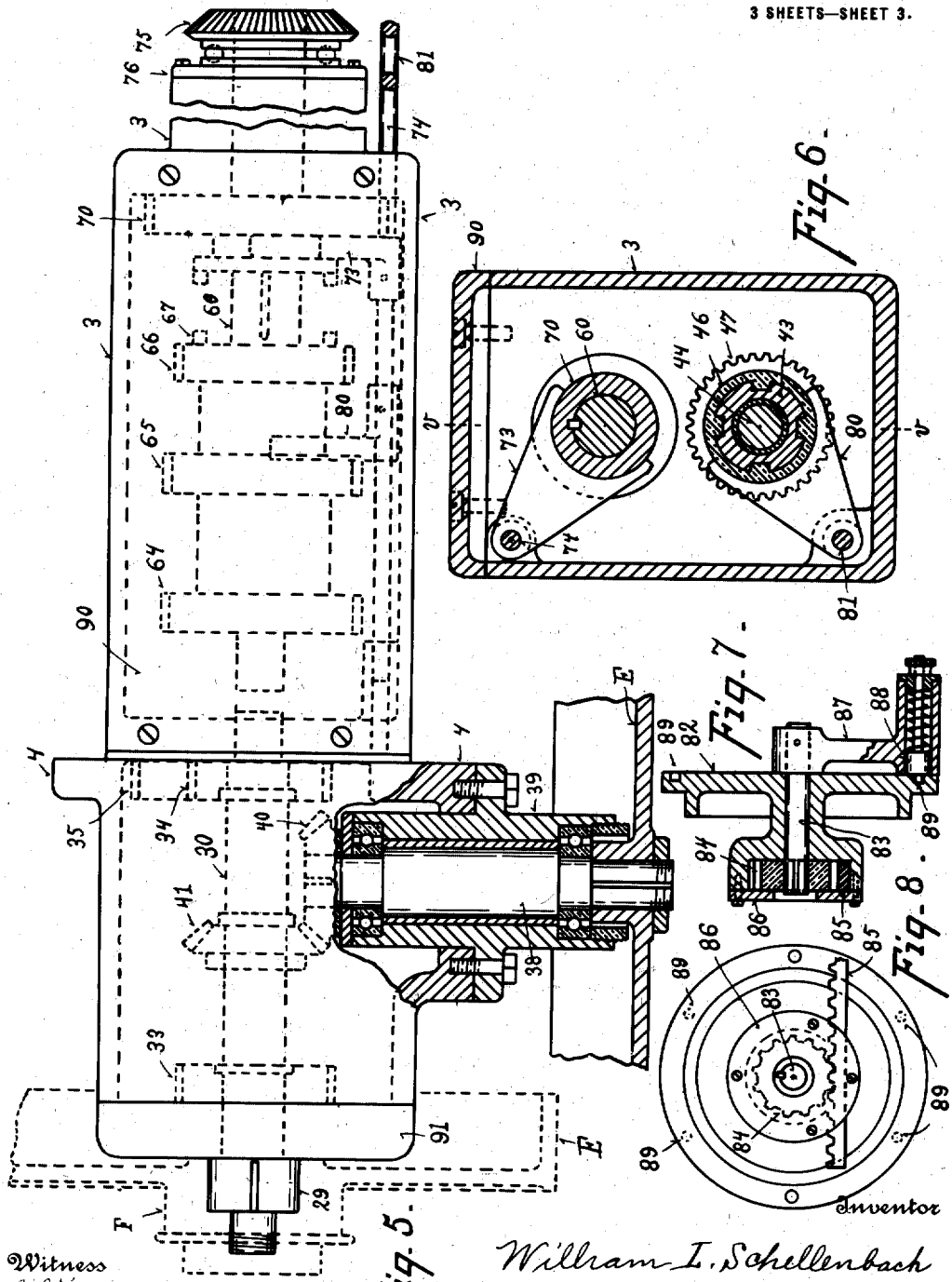

WILLIAM L. SCHELLENBACH, OF WYOMING, OHIO.

INITIAL DRIVING MECHANISM.

1,250,363.　　　Specification of Letters Patent.　　Patented Dec. 18, 1917.

Application filed August 17, 1916. Serial No. 115,542.

*To all whom it may concern:*

Be it known that I, WILLIAM L. SCHELLENBACH, a citizen of the United States, residing at Wyoming, in the county of Hamilton and State of Ohio, have invented certain new and useful Improvements in Initial Driving Mechanism, of which the following is a specification.

My invention relates to an initial driving mechanism to be detachably mounted upon metal boring mills, milling machines and other similar mechanisms. One of its objects is to provide an initial driving mechanism with stopping, starting, and forward and reverse drive. Another object is to provide an initial driving mechanism with provision for selectively driving the same by belt in either of two different planes.

Another object is to provide for a wide range of speed changes and an improved and compact arrangement of speed changing mechanism and improved shifting mechanism therefor. My invention also comprises certain details of form, combination and arrangement all of which will be fully set forth in the description of the accompanying drawings in which, Figure 1 illustrates in side elevation, a metal boring machine with my improved initial driving mechanism applied thereto.

Fig. 2 is a vertical section through the initial driving mechanism on line *v v* of Fig. 6.

Fig. 3 is a vertical section through the same on line *x x* of Fig. 2.

Fig. 4 is a diagram of the reverse driving gears.

Fig. 5 is a top plan view of the initial driving mechanism detached.

Fig. 6 is a vertical section on line *z z* of Fig. 2.

Fig. 7 is a sectional detail of one of the change gear shifting members.

Fig. 8 is an inside plan view of Fig. 7.

The accompanying drawings illustrate the preferred embodiment of my invention and its application to a metal boring machine. As illustrated A represents the main frame or column of a metal boring machine which is provided with the usual work table B and drill spindle C with mechanism to be driven from the initial driving mechanism to rotate the drill spindle, and to feed the drill spindle longitudinally.

I preferably provide an eye or recess 2 in the main frame A to receive and partially contain the housing or frame 3 of the initial driving mechanism. A flange 4 and bolts 5 serve to firmly secure the frame 3 to the main frame A. The casing 3 is preferably closed and arranged to hold a quantity of lubricant to be applied to the operative parts therein by a splash system.

Within the casing 3 is a shaft 6 journaled at 7 and 8 and provided with two clutch members 9 and 10 loosely journaled on shaft 6. The clutch members respectively carry spur gears 11 and 12. Between the clutch members 9 and 10 are clutch members 14 and 15 which are keyed to the shaft 6. The clutch members 14 and 15 are provided with split rings 16 and 17 which are adapted to be expanded to selectively clutch the respective clutch members 14 and 15 to the clutch members 9 and 10, which is effected by means of levers 18 to expand the slit rings, and a sliding collar 19 to engage and actuate a lever 18 at its right hand or at its left hand. A forked arm 20 is mounted upon a rod 21 which is movable endwise in recesses bored in the casing 3. A crank shaft 24 journaled in the casing 3 has a crank arm 25 inside the casing to shift the rod 21 and arm 20, and a crank shaft 26 outside the casing 3 connected by a link 27 to a hand lever 28 located at any position convenient to the operator.

A shaft 30 journaled parallel to shaft 6 within the casing 3 at 31 and 32 is provided with a spur gear 33 continually in mesh with gear 11, and a spur gear 34 in line with spur gear 12 with which it is operatively engaged by means of a spur gear 35 mounted on a stud shaft carried by the casing 3. Thus when the clutch member 9 is clutched to shaft 6, the gears 11 and 33 cause the shafts 6 and 30 to rotate in opposite directions, and when clutch member 10 is clutched to shaft 6, the gears 12, 34, and 35 cause the shafts 6 and 30 to rotate in the same direction.

In order that the machine to which the initial driving mechanism is applied may be located either parallel with or transversely to its line shaft, I provide for attaching a belt pulley E either upon the hub 29 of the clutch member 11, as shown in Fig. 2 in full line, or for mounting the belt pulley E upon a shaft 38 journaled in a sleeve 39 which is detachably connected to the casing 3. The shaft 38 is provided with a beveled gear 40 which meshes with a beveled gear 41 mounted rigidly on the shaft 30. A small belt pulley F serves to operate a pump, not shown to pump lubricant to the drill or other cutting tools.

The inner end of shaft 6 is cup-shaped and is connected by keys 42 to a sleeve 43 which is loosely journaled on the shaft 44, and serves as a journal for one end of shaft 44. At its opposite end shaft 44 is journaled in casing 3 at 45. The sleeve 43 is prevented from moving endwise, but it carries a sleeve 46 which is keyed to and movable endwise on sleeve 43. The sleeve 46 is provided with spur gears 47 and 48, and a clutch member 49. The shaft 44 is provided with a spur gear 51 and a spur gear 50 provided with a clutch member 52 to engage the clutch member 49. The gears 50 and 51 are rigidly mounted on shaft 44.

A shaft 60 is journaled at 61 and 62 near opposite ends in the casing 3 and parallel to shaft 44. A sleeve 63 is loosely journaled on shaft 60 but confined against movement endwise thereon. The sleeve 63 is provided with spur gears 64, 65 and 66. The spur gear 66 is continuously in mesh with the gear 50 on shaft 44, and is provided with a clutch member 67. The gears 64 and 65 may be respectively meshed with or disengaged from gears 47 and 48 by shifting the sleeve 46 to various positions endwise. Also at the extreme movement of sleeve 46 the clutch member 49 can be engaged with clutch member 52 to lock the sleeves 43 and 46 to the shaft 44. A gear 70 is splined to shaft 60, and has two positions of adjustment, in one position gear 70 is in mesh with gear 51 on shaft 44, and in the other position the clutch member 72 carried by gear 70 is in engagement with clutch member 67, to cause the sleeve 63 to rotate with shaft 60. A forked arm 73 carried by the shifting rod 74 enables the gear 70 to be shifted endwise on shaft 60.

Outside of the casing 3 a beveled gear 75 is rigidly mounted on shaft 60, and is provided with a detachable thrust collar 76, which may be detached and renewed when required. The beveled gear 75 meshes with a beveled gear 77 permanently mounted on a shaft 78 journaled in the frame A, and from which power is transmitted through suitable gearing to drive the drill spindle or other mechanism.

In order to shift the sleeve 46 endwise on the sleeve 43 to which it is splined, I provide a forked arm 80 to engage the sleeve 46 between the gears 47 and 48. The forked arm 80 is carried by a shifting rod 81 mounted to slide endwise in the casing 3. In order to actuate the shifting rods 74 and 81 from any desired position on the main frame A, I provide two flanges 82, 82' to be detachably mounted on the frame A. Shafts 83, 83' are mounted in the respective flanges and provided with pinions 84, 84' which engage respectively racks 85 on the ends of the shifting rods 74 and 81. The racks 85 are guided in recesses in the flanges 82, 82' and are retained in place relative thereto by means of keeper disks 86. At the opposite ends of the shafts 83, 83' are hand levers 87, 87' which are provided with spring latch pins 88 to engage recesses 89' in the face of the flanges to secure the sleeve 46 and gear 70 to the different desired positions of adjustment.

The casing 3 is preferably provided with a detachable cap 90 to give access to the shafts 44 and 60 and gears thereon, and a detachable cap 91 at its outer end, and preferably a hand hole 92 at one side. To take the end thrust of the beveled gear 41 I preferably provide a thrust collar 93 for the shaft 30. When the sleeve 19 is in a central position both clutches 9 and 10 are disengaged, hence lever 28, serves to start, stop and reverse the direction of motion. The casing 3 may be variously modified externally to facilitate its attachement to machines of different types.

The mechanism herein illustrated is capable of considerable modification without departing from the principle of my invention.

Having described my invention what I claim is.

1. A detachable initial driving mechanism comprising a housing to be detachably seated in a recess in the main frame of the machine to be driven, said housing containing speed changing mechanism and having externally a belt driving pulley, a driven gear to transmit motion to the machine to be driven, and a starting lever to clutch the driving pulley in operative relation to the driven gear in either forward or reverse relation.

2. An initial driving mechanism comprising a housing to be detachably connected to the machine to be driven, said housing containing speed changing mechanism and having externally a plurality of shafts with axes at right angles to each other to interchangeably receive a driving pulley and a driven gear to transmit motion to the machine to be driven.

3. A mechanism of the character described comprising a housing to be detachably connected to a machine to be driven, a first shaft journaled in said housing and provided with a pair of loosely journaled clutch members provided with gears to drive them, clutch members keyed to said first shaft to clutch said first shaft to said loosely journaled clutch members respectively, means to engage and disengage said clutch members from the exterior of said housing, a second shaft journaled in said housing parallel to said first shaft, means to continuously drive said second shaft in one direction from the exterior of said housing connecting said second shaft in driving relation with the gears on said loosely journaled clutch members to continuously rotate said clutch members in opposite directions, speed changing mechanism within said housing driven from said first shaft, and a driven element exteriorly of said housing to engage and drive the mechanism of the machine to be driven.

4. A mechanism of the character described comprising a housing to be detachably connected to a machine to be driven, a first shaft journaled in said housing and provided with a pair of loosely journaled clutch members provided with gears to drive them, clutch members keyed to said first shaft to clutch said first shaft to said loosely journaled clutch members respectively, means to engage and disengage said clutch members from the exterior of said housing, a second shaft journaled in said housing parallel to said first shaft, two independent members projecting through said housing at right angles to each other to selectively receive a driving pulley to continuously drive said second shaft in one direction, gears connecting said second shaft in driving relation with the gears on said loosely journaled clutch members to continuously rotate said clutch members in opposite directions, speed changing mechanism within said housing driven from said first shaft, and a driven gear exteriorly of said housing to engage and drive the mechanism of the machine to be driven.

5. A mechanism of the character described comprising a housing to be detachably connected to the frame of a machine to be driven, a first shaft journaled in said housing and adapted to be driven in forward or reverse direction, a second shaft journaled in said housing to be continuously driven in one direction, and operatively connected to said first shaft to drive it in opposite directions, a third shaft in axial alinement with said first shaft and provided with a plurality of rigidly mounted gears of different diameters, means to clutch said first shaft and third shaft together, a change gear sleeve splined to and movable endwise on said first shaft, means to shift said sleeve from the exterior of the housing, a fourth shaft provided with a gear and a clutch member splined thereto and movable endwise thereon, and a driven gear exteriorly of said housing, a sleeve loosely journaled on said fourth shaft and provided with a clutch member to engage the clutch member of the gear splined to said fourth shaft, a gear on said fourth shaft sleeve continuously in mesh with a gear on said third shaft, and means to shift said gear and clutch member splined to said fourth shaft from the exterior of said casing.

6. In a detachable initial driving mechanism a housing a first and second shaft one to be continuously driven in one direction and the other to be selectively driven in either forward or reverse direction a third shaft in axial alinement with said first shaft and provided with a pair of gears rigidly mounted thereon, a clutch member carried by said third shaft to clutch it to said first shaft, and a sleeve splined to said first shaft and provided with a clutch member to engage the clutch member of said third shaft, a fourth shaft journaled in said housing and provided with a driven gear externally thereof, a sleeve loosely journaled on said fourth shaft and provided with a plurality of gears and a clutch member, one of the gears of said sleeve being continuously in mesh with one of the gears rigidly mounted on said third shaft, a gear splined to said fourth shaft and meshing with the other gear rigidly mounted on said third shaft, a clutch member carried by said gear splined to said fourth shaft to engage the clutch member of said sleeve on the fourth shaft, independent shifting rods to shift said gear and clutch splined to said fourth shaft, and said geared sleeve splined to said first shaft, and means exteriorly of said housing to indicate and lock said shifting rods to different operative positions.

7. In a driving mechanism a first shaft to be selectively driven in either forward or reverse direction, a third shaft in axial alinement with said first shaft at one end thereof, a plurality of gears on said third shaft, a fourth shaft journaled parallel to said first and third shafts, a sleeve loosely journaled on said fourth shaft and provided with a gear continuously in mesh with one of the gears on said third shaft, and a gear splined to said fourth shaft and adjustable to mesh with another gear on said third shaft, clutch members to clutch said first shaft and third shaft together and clutch members to clutch said fourth shaft sleeve to said gear splined to said fourth shaft, speed change gears carried by said fourth shaft sleeve, and a change gear sleeve splined to said first shaft and adjustable thereon to mesh with gears with different gears on said fourth shaft sleeve.

8. In a detachable initial driving mechanism, a housing, a driving pulley externally thereof to continuously rotate in one direction a shaft journaled in said housing to continuously rotate in one direction, a shaft journaled in said housing to rotate in forward or reverse direction means exteriorly of said housing to control the movements of said reversably rotatable shaft, a driven gear exteriorly of said housing, speed changing mechanism within said housing interposed between said reversably rotatable shaft and said driven gear, a plurality of change gear shifting members extending exteriorly of said housing, and means exteriorly of said housing to independently actuate said shifting members and to lock said shifting members to and indicate their respective positions.

9. In a detachable initial driving mechanism, a housing to be detachably connected to a machine to be driven, a driving pulley to continuously rotate in one direction, a shaft journaled in said housing to continuously rotate in one direction, a shaft journaled in said housing to rotate in forward or reverse direction, means actuated from the exterior of said housing to control the movements of said reversably rotatable shaft, speed changing mechanism within said housing driven from said reversably rotatable shaft, a driven gear exteriorly of said housing driven from said reversably rotatable shaft through said speed changing mechanism, and means actuated from the exterior of said housing to shift said speed changing mechanism from one speed to another.

10. In a detachable initial driving mechanism a housing to detachably seat in a recess in the frame of the machine to be driven, a driving pulley to continuously rotate in one direction, a shaft journaled in said housing to continuously rotate in one direction, a shaft journaled in said housing to rotate in forward or reverse direction, means actuated from the exterior of said housing to control the movements of said reversably rotatable shaft, speed changing mechanism within said housing driven from said reversably rotatable shaft, a driven gear exteriorly of said housing driven from said reversably rotatable shaft through said speed changing mechanism, and means actuated from the exterior of said housing to shift said speed changing mechanism from one speed to another.

11. A detachable initial driving mechanism comprising a housing to be detachably connected to a machine to be driven, speed changing mechanism located within said housing, a shaft projecting from said housing and having exteriorly thereof a driving element to drive said speed changing mechanism, a shaft driven by said speed changing mechanism and projecting from said housing, and a power transmitting element on said driven shaft exteriorly of said housing.

12. A detachable initial driving mechanism comprising a housing to be detachably connected to a machine to be driven, speed changing mechanism located in said housing, a shaft projecting from said housing on which a driving element is mounted exteriorly of said housing, a shaft projecting from said housing, driven by said speed changing mechanism and on which a power transmitting element is mounted exteriorly of said housing, and a starting lever operable from the exterior of said housing to operatively connect said power transmitting element to said driving element to drive said transmitting element in either forward or reverse direction relative to said driving element.

In testimony whereof I have affixed my signature in the presence of two witnesses.

WILLIAM L. SCHELLENBACH.

Witnesses:
  C. W. MILES,
  W. THORNTON BOGERT.